Patented July 9, 1935

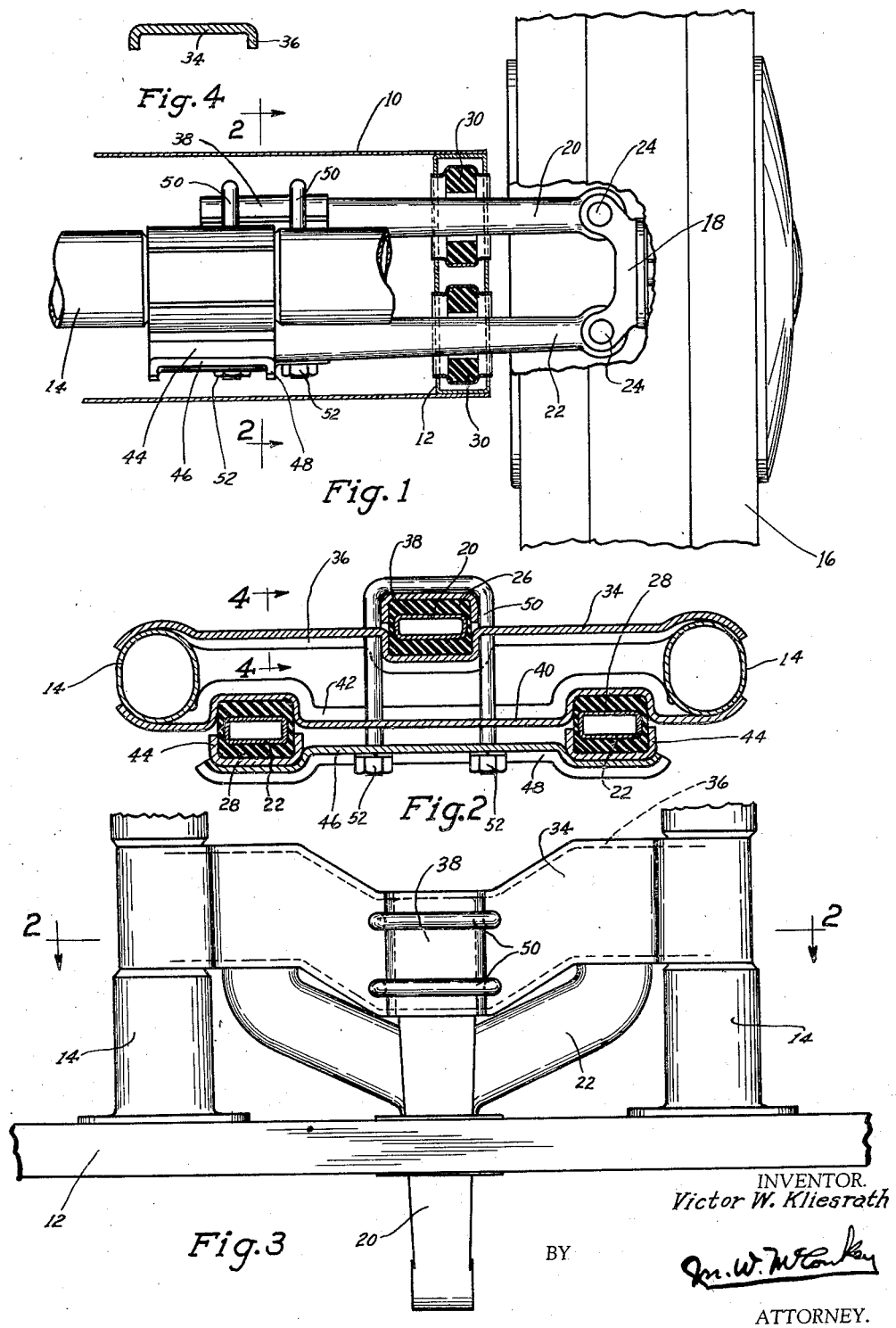

2,007,202

UNITED STATES PATENT OFFICE 2,007,202

VEHICLE

Victor W. Kliesrath, South Bend, Ind., assignor to The Steel Wheel Corporation, Chicago, Ill., a corporation of New York Application December 13, 1933, Serial No. 702,140

16 Claims. (Cl. 280—124)

This invention relates to vehicles, and is illustrated as embodied in a novel spring suspension for one rear wheel of an automobile. An object is to provide a strong but inexpensive mounting for axle sections or arms or the like forming an individual spring suspension for the wheel. Some of the features of the invention relate to forming steel stampings with a novel construction and arranging them in a novel manner to provide such a mounting.

In one desirable arrangement, the vehicle has a pair of cross members, shown as spaced parallel tubular braces, which serve as parts on which to mount the wheel mounting, and which are bridged by novel upper and lower supports which carry the axle sections or their equivalents. Preferably these supports are steel stampings provided between their ends with sockets or the like to hold the axle sections, and with separate caps which are clamped in place in the preferred arrangement by clamp bolts or other means which also serve to clamp the two supports to the above-described cross members.

In the illustrated arrangement, the upper support has a socket centrally arranged and provided with rubber or the like for yieldingly holding the end of the upper axle section, while the lower support has adjacent its ends similar sockets receiving the ends of the two arms of a Y-shaped lower axle section. The two lower sockets are closed by caps or other devices bridged by a holding member, preferably a resilient stamped steel part, which is shown engaged by U-bolts encircling the cap of the upper socket, and which not only hold the three caps but also serve to clamp the two supports respectively against the top and the bottom of the tubular cross members.

The above and other objects and features of the invention, including various novel combinations of parts and desirable particular constructions, will be apparent from the following description of the illustrative embodiment shown in the accompanying drawing, in which:

Figure 1 is a transverse vertical section through one side of an automobile chassis, at the left rear wheel, showing the axle sections for the wheel in side elevation;

Figure 2 is a section generally on the lines 2—2 of Figures 1 and 3;

Figure 3 is a top plan view of the parts shown in Figure 1, but with the wheel and its knuckle removed, and with the top plate of the chassis frame omitted; and Figure 4 is a section through one support, on the line 4—4 of Figure 2.

In the arrangement illustrated, a base member 10 of a body (not shown) performs the functions of the usual chassis frame, and is formed with reinforced side members 12 rigidly connected opposite the rear wheels by parts such as a pair of parallel spaced tubular cross braces 14. Adjacent the side members 12, the cross braces 14 are deformed as shown in Figure 3 to provide elliptical or other non-circular seats for the novel brackets described below.

The wheel 16 is rotatably mounted in any desired manner on a spindle or other means carried by or integral with a knuckle 18, extending vertically and connected to upper and lower axle sections 20 and 22. The connections between the axle sections and the knuckle may include rubber bushings vulcanized internally to pins 24 carried by the knuckle and externally to eyes formed in the ends of the axle sections.

The upper axle section 20 is shown as a straight bar or arm having its inner end seated in a rubber or other non-metallic yielding block 26 carried by the novel supporting means described below. The lower axle section 22 is Y-shaped in plan view and has spaced arms seated at their inner ends in similar rubber blocks 28 carried by the supporting means. The axle sections pass through annular rubber bumpers 30 arranged in openings in the side member 12 through which the axle sections pass. The illustrated axle sections are made by welding together, face to face, channel-section steel stampings.

The spring suspension as described above, except in its combination with the novel supporting means described below, is mainly of the same construction and arrangement as that more fully described (and claimed) in my prior application No. 679,473, filed July 8, 1933. It is not my intention to claim in the present application any of the subject-matter of said prior application.

According to an important phase of the present invention, the blocks 26 and 28, or other means holding the axle sections, are arranged in sockets in upper and lower supports bridging across and secured to the cross members 14.

The upper support, shown at 34, is in the form of an elongated resilient steel stamping, curved at its ends to fit against the tops of the elliptical seats of the cross members 14, and reinforced along its edges by integral stiffening flanges 36. The support 34 is formed centrally of its length with an integrally-drawn upwardly-facing socket for the block 26 of the upper axle section 20, and is provided with a suitable cap 38 for holding the block in the socket.

The lower support, shown at 40, is curved at its ends to engage the lower faces of the non-circular seats of the cross members 14, and is reinforced at its edges by suitable stiffening flanges 42. This support has adjacent its opposite ends integrally-drawn downwardly-facing sockets for the blocks 28 of the lower axle section 22, which sockets have caps 44 to cooperate therewith in inclosing the blocks.

The two lower caps 44 are shown held by a resilient stamped steel clamp member 46, reinforced at its edges by a stiffening flange 48, and which bridges across between the two caps. The clamp member 46 is shown formed with openings for the legs of U-bolts 50 which encircle the upper cap 38, and which have threaded on their ends nuts or the like 52 which cooperate with the bolts to clamp the entire assembly resiliently together.

As explained in my prior application No. 679,473, the upper section 20 is preferably shorter than the lower section 22, so that the linkage is not a true parallelogram. By this means the wheel 16 is tilted slightly as it moves up and down, to keep in a straight vertical line the point at which the tire of the wheel engages the road.

While one illustrative embodiment has been described in detail, it is not my intention to limit the scope of the invention to that particular embodiment, or otherwise than by the terms of the appended claims.

I claim:

1. A vehicle having a pair of parallel spaced cross frame members, upper and lower axle members at the side of the vehicle, a support member having the lower sides of its ends resting on the tops of the cross members and having a socket facing upwardly centrally of its length and receiving one end of the upper axle member, a corresponding support engaging the lower sides of the cross members with its ends and having a pair of downwardly-facing sockets between its ends, the lower axle member having spaced parts received in said sockets, caps for the three sockets, a member bridging across and engaging the two lower caps at its ends, and U-bolts encircling the upper cap and having their legs passing through the bridging member and provided with nuts for tensioning the central portion of the bridging member upwardly and the upper cap downwardly.

2. A vehicle having a pair of parallel spaced cross frame members, upper and lower axle members at the side of the vehicle, a stamped steel support member having the lower sides of its ends resting on the tops of the cross members and having a socket drawn integrally therein and facing upwardly centrally of its length and receiving one end of the upper axle member, a corresponding stamped steel support engaging the lower sides of the cross members with its ends and having a pair of downwardly-facing sockets drawn integrally therein between its ends, the lower axle member having spaced parts received in said sockets, caps for the three sockets, a member bridging across and engaging the two lower caps at its ends and U-bolts encircling the upper cap and having their legs passing through the bridging member and provided with nuts for tensioning the central portion of the bridging member upwardly and the upper cap downwardly.

3. A vehicle having a pair of parallel spaced cross frame members, upper and lower axle members at the side of the vehicle, a support member having the lower sides of its ends resting on the tops of the cross members and having a socket facing upwardly centrally of its length and receiving one end of the upper axle member, a corresponding support engaging the lower sides of the cross members with its ends and having a pair of downwardly-facing sockets between its ends, the lower axle member having spaced parts received in said sockets, caps for the three sockets, nonmetallic resilient material in the sockets and held by the caps and engaging the axle members, a member bridging across and engaging the two lower caps at its ends, and U-bolts encircling the upper cap and having their legs passing through the bridging member and provided with nuts for tensioning the central portion of the bridging member upwardly and the upper cap downwardly.

4. A vehicle having a pair of parallel spaced cross frame members, upper and lower axle members at the side of the vehicle, a support member having the lower sides of its ends resting on the tops of the cross members and having a socket facing upwardly centrally of its length and receiving one end of the upper axle member, a corresponding support engaging the lower sides of the cross members with its ends and having a pair of downwardly-facing sockets between its ends, the lower axle member having spaced parts received in said sockets, caps for the three sockets, a member bridging across and engaging the two lower caps at its ends, and U-bolts encircling the upper cap and having their legs passing through the bridging member and provided with nuts for tensioning the central portion of the bridging member upwardly and the upper cap downwardly, the socket for the upper axle member being nearer the side of the vehicle than the sockets for the lower axle member.

5. A vehicle having a pair of parallel spaced cross frame members, upper and lower axle members at the side of the vehicle, a support member having the lower sides of its ends resting on the tops of the cross members and having a socket facing upwardy centrally of its length and receiving one end of the upper axle member, a corresponding support engaging the lower sides of the cross members with its ends and having a pair of downwardly-facing sockets between its ends, the lower axle member having spaced parts received in said sockets, caps for the three sockets, a member bridging across and engaging the two lower caps at its ends and means engaging the bridging member and the upper cap and holding all of the specified parts assembled together as described.

6. A vehicle having a pair of parallel spaced cross frame members, upper and lower axle members at the side of the vehicle, a support member having the lower sides of its ends resting on the tops of the cross members and having a socket facing upwardly centrally of its length and receiving one end of the upper axle member, a corresponding support engaging the lower sides of the cross members with its ends and having a pair of downwardly-facing sockets between its ends, the lower axle member having spaced parts received in said sockets, caps for the three sockets, a member bridging across and engaging the two lower caps at its ends, and bolts engaging the bridging member and the upper cap and holding all of the specified parts assembled together as described.

7. A vehicle having spaced frame members, and means for mounting axle parts thereon comprising supports formed between their ends with sockets for the axle members and which supports engage respectively the upper and lower faces of the frame members, caps for the sockets, and fastening means urging the upper and lower caps toward each other and holding the caps in place on the supports and through the caps holding the two supports securely engaged with the frame members.

8. A vehicle having spaced frame members, and means for mounting axle parts thereon comprising supports provided between their ends with holding means for the axle members and which supports engage respectively the upper and lower faces of the frame members, and fastening means urging the upper and lower holding means toward each other and holding the two supports securely engaged with the frame members.

9. A vehicle having frame members, and means for mounting axle parts thereon comprising supports for the axle members engaging at their ends the upper and lower faces of the frame members, and means for urging the supports toward each other to cause them to grip the frame members between them to secure them thereto.

10. A vehicle having frame members, and means for mounting axle parts thereon comprising resilient stamped steel supports for the axle members engaging at their ends the upper and lower faces of the frame members, and means for urging the supports toward each other resiliently under tension to cause them to grip the frame members between them to secure them thereto.

11. A support for a vehicle axle member of stamped steel and provided near its ends with integrally-drawn sockets for said member and having its ends formed to engage and grip spaced vehicle frame members.

12. A support for a vehicle axle member of stamped steel and provided with an integrally-drawn cup-shaped socket for holding a resilient non-metallic block engaging said member and having its ends formed to engage and grip spaced vehicle frame members.

13. A support for a vehicle axle member of stamped steel and provided at its center with an integrally-drawn cup-shaped socket for holding a resilient non-metallic block engaging said member and having its ends formed to engage and grip spaced vehicle frame members.

14. An axle-member mounting comprising a pair of supports for the axle members engageable at their ends with opposite sides of vehicle frame members and spaced apart between their ends and means between the ends of said supports for forcing them toward each other to grip said vehicle frame members resiliently.

15. An axle-member mounting comprising a pair of resilient stamped steel supports for the axle members engageable at their ends with opposite sides of vehicle frame members and spaced apart between their ends and means between the ends of said supports for forcing them toward each other under resilient tension to grip said vehicle frame members resiliently.

16. An axle-member mounting comprising a pair of supports for the axle members and means for forcing them toward each other to grip vehicle frame members between their ends, and axle-member holding devices also held by said means.

VICTOR W. KLIESRATH.